United States Patent
White et al.

(10) Patent No.: US 12,124,865 B2
(45) Date of Patent: Oct. 22, 2024

(54) SYSTEM AND METHOD FOR PROVIDING PAGE MIGRATION

(71) Applicants: ATI Technologies ULC, Markham (CA); Advanced Micro Devices, Inc., Santa Clara, CA (US)

(72) Inventors: Sean T. White, Boxborough, MA (US); Philip Ng, Markham (CA)

(73) Assignees: ADVANCED MICRO DEVICES, INC., Santa Clara, CA (US); ATI TECHNOLOGIES ULC, Markham (CA)

(*) Notice: Subject to any disclaimer, the term of this patent is extended or adjusted under 35 U.S.C. 154(b) by 601 days.

(21) Appl. No.: 17/219,051

(22) Filed: Mar. 31, 2021

(65) Prior Publication Data

US 2022/0318040 A1 Oct. 6, 2022

(51) Int. Cl.
G06F 9/455 (2018.01)
G06F 12/06 (2006.01)
G06F 12/0811 (2016.01)
G06F 12/0882 (2016.01)

(52) U.S. Cl.
CPC ...... *G06F 9/45545* (2013.01); *G06F 9/45558* (2013.01); *G06F 12/063* (2013.01); *G06F 12/0811* (2013.01); *G06F 12/0882* (2013.01); *G06F 2009/45579* (2013.01); *G06F 2009/45583* (2013.01); *G06F 2009/45587* (2013.01)

(58) Field of Classification Search
CPC ............... G06F 9/45558; G06F 12/063; G06F 12/0811; G06F 12/0882; G06F 2009/45579; G06F 2009/45583; G06F 2009/45587
See application file for complete search history.

(56) References Cited

U.S. PATENT DOCUMENTS

| | | | | |
|---|---|---|---|---|
| 10,846,117 | B1* | 11/2020 | Steinberg | G06F 21/56 |
| 2009/0113425 | A1* | 4/2009 | Ports | G06F 9/4881 718/1 |
| 2010/0293420 | A1 | 11/2010 | Kapil et al. | |
| 2014/0068207 | A1* | 3/2014 | Aslot | G06F 9/4856 711/E12.071 |

(Continued)

FOREIGN PATENT DOCUMENTS

KR    100987332 B1    10/2010

OTHER PUBLICATIONS

Alexander C. Winter, GPU Parallelization, Validation, and Characterization of the Tensor Template Library, 2019 (Year: 2019).*

(Continued)

*Primary Examiner* — Dong U Kim

(57) ABSTRACT

Methods and apparatus for providing page migration of pages among tiered memories identify frequently accessed memory pages in each memory tier and generate page hotness ranking information indicating how frequently memory pages are being accessed. Methods and apparatus provide the page hotness ranking information to an operating system or hypervisor depending on which is used in the system, the operating system or hypervisor issues a page move command to a hardware data mover, based on the page hotness ranking information and the hardware data mover moves a memory page to a different memory tier in response to the page move command from the operating system.

19 Claims, 4 Drawing Sheets

(56) References Cited

U.S. PATENT DOCUMENTS

| | | | | |
|---|---|---|---|---|
| 2014/0164621 A1* | 6/2014 | Nakama | ............... | H04L 47/70 709/226 |
| 2016/0299851 A1* | 10/2016 | Mattson, Jr. | ......... | G06F 12/145 |
| 2018/0165208 A1* | 6/2018 | Farey | ................ | G06F 12/0868 |
| 2019/0042145 A1* | 2/2019 | Pham | ................... | G06F 3/0683 |
| 2020/0310993 A1 | 10/2020 | Kumar et al. | | |
| 2022/0206842 A1* | 6/2022 | Sahita | ................. | G06F 9/4856 |

OTHER PUBLICATIONS

International Search Report and Written Opinion, PCT/US2022/021818, Jun. 13, 2022 12 pages.

\* cited by examiner

SYSTEM AND METHOD FOR PROVIDING PAGE MIGRATION

BACKGROUND OF THE DISCLOSURE

Memory controllers, including direct memory access (DMA) controllers, are circuits that translate accesses generated by a memory accessing agent such as a data processor into one or more commands that are understood by computer memory. A memory controller can be implemented as a separate chip or integrated with other components such as data processors on a single integrated circuit chip. In the latter case, the memory controller is usually called an integrated memory controller. Integrated memory controllers support various bus protocols, such as the dynamic random-access memory (DRAM) bus protocol and the double data rate dynamic random-access memory (DDR DRAM) bus protocol. The need for tight coupling of memory with computing resources like processors such as central processing units (CPUs), graphics processing units (GPUs), digital signal processors (DSPs), and the like pose challenges to the system designer related to memory capacity requirements, memory controller availability, memory lifecycle limitations, and memory bandwidth availability to CPUs. Capabilities such as in-memory workloads and server virtualization drive the need for increasing memory capacity. Moreover, the increasing performance of CPUs (e.g., one or more cores) creates a need for more memory channels per socket. For example, memory capacity requirements are driven by the number of CPUs in order to maintain balanced computational resources for many workloads.

Tiered memory systems are composed of two or more regions of memory with different latency and/or bandwidth characteristics. Examples: 2-socket systems have "local" and "remote" tiers of memory, even if all the memory is traditional DRAM. The industry is developing new combinations of tiered memory such as HBM and DRAM, DRAM and CXL Type 3 memory expansion devices, DRAM and NVDIMM-P. Some examples of latency and bandwidth differences may include for example, CXL-attached memory that has a higher latency and different bandwidth characteristics versus DRAM. HBM may have similar latency characteristics to DRAM but much higher bandwidth. Due to performance differences between memory tiers, it is desirable to move frequently used pages from slower memory tiers into faster tiers, and move infrequently used pages from faster memory tiers into slower tiers. For ease of management, such as assigning memory to a process, memory may be divided into pages of various sizes such as 4 KiB, 2 MiB, 1 GiB Using page migration improves performance by making best use of the faster tiers of memory.

With the rapid development of multiple competing memory technologies ongoing, there is no clear best technology or solution or interface currently. Hardware-only solutions have been proposed but would be proprietary and unlikely to pick the best memory solution out of current and yet to emerge options. Also, hardware-only solutions for page migration may perform well on some workloads but badly on others and can be difficult to adjust the operation based on behavior. Also, with virtualization and the need for enhanced security between hypervisor and virtual machines, hardware only solutions may not be robust enough to adapt to security needs. Other solutions that perform page migration use software-only solutions that may be more flexible than hardware-only solutions, but software implemented data movement will be lower performance than hardware-implemented data movement. Also known systems may not provide suitable security since, for example, a hypervisor may not be able to migrate pages in use by guest virtual machines that are protected by advanced security features.

BRIEF DESCRIPTION OF THE DRAWINGS

The implementations will be more readily understood in view of the following description when accompanied by the below figures, wherein like reference numerals represent like elements, and wherein.

Figure 1:
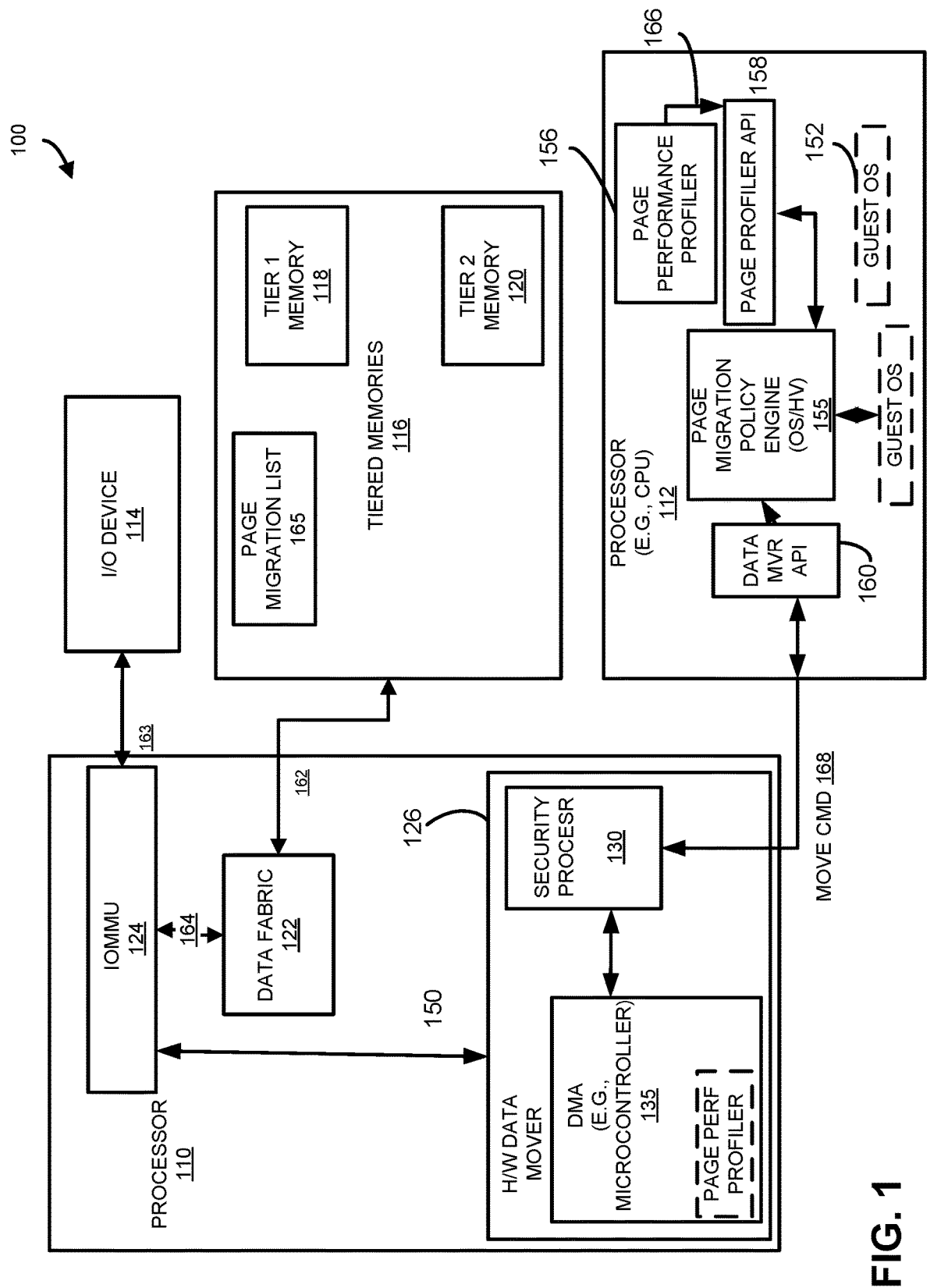
FIG. 1 is a block diagram an apparatus for providing page migration in accordance with one example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Apparatus and methods provide a type of hybrid hardware/software architecture using three components for page migration operation. In some implementations a software profiling driver is employed and executes for example in a CPU and profiles system traffic to inform software decision making such a by an operating system or hypervisor. A hypervisor/operating system serves as a page migration policy engine to make decisions tied to hypervisor/OS page management. A hardware data mover, such as micro controller executing firmware, supports migration of pages at the direction of the hypervisor/operating system. This architecture allows a wide range of flexibility for different memory technologies and workloads. In some implementations, new commands have been developed that are issued by the hypervisor/operating system to the hardware data mover to allow improved page migration operation.

In some implementations, a server processor supports page migration between tiers of memory regions, for example, direct-attached DRAM and slower tiered memory. In some implementations page migration is used to allow relocation of frequently accessed pages of a system memory from a slower memory tier to a faster one to improve performance. The mix of DRAM and other devices are mapped to system memory, in some examples not memory mapped IO (MMIO). The non-DRAM regions typically have a higher latency and possibly are larger than the DRAM regions due to characteristics of the device technology, such as longer read/write access times and greater bit-density. To improve performance, the profiler identifies frequently accessed pages that are currently in the slower tiers and the hypervisor or OS migrates those pages to faster memory such as DRAM while leaving infrequently accessed pages in a slower system tier. Also, the hypervisor or OS moves pages from the faster tier to the slower tier as needed. In one example, frequently accessed pages in the faster tier are not chosen for migration to the slower tier.

In some implementations, a method for providing page migration of pages among tiered memories includes identifying frequently accessed memory pages in each tiered memory region and generate page hotness ranking information indicating how frequently memory pages are being accessed, providing the page hotness ranking information to at least one of: an operating system or hypervisor, issuing a page move command, by the operating system or hypervisor, to a hardware data mover, based on the page hotness ranking information, and moving, by the hardware data mover, a memory page from one memory tier to another memory tier in response to the page move command from the operating system or hypervisor.

In certain implementations, the method includes issuing command data that causes the hardware data mover to provide a secure nested paging batch move of multiple memory pages to a different memory tier.

In some implementations the method includes issuing command data that causes the hardware data mover to provide a secure nested paging move of one or more memory pages securely owned by a guest operating system.

In certain implementations the method includes issuing command data that causes the hardware data mover to move contents of one or more pages that may be actively in use by a direct memory access device in a non-secure nested paging system to memory that is either unencrypted or encrypted using an operating system or hypervisor owned key.

In some implementations the method includes issuing command data that causes the hardware data mover to provide a secure nested paging move of pages that may be actively in use by a direct memory access device.

In certain implementations the method includes providing an application programming interface (API) between the operating system or hypervisor and the hardware data mover that provides the move commands to the hardware data mover and provides returned page migration data from the hardware data mover to the operating system.

In some implementations the method includes delaying DMA operations in the input output memory management unit while servicing the page move command.

In some implementations an apparatus for providing page migration of pages among tiered memories includes: one or more processors configured to execute stored code that when executed cause the one or more processors to: identify frequently accessed memory pages in each memory tier region and generate page hotness ranking information indicating how frequently memory pages are being accessed. The apparatus includes an operating system or hypervisor configured to issue a page move command to a hardware data mover, based on the page hotness ranking information. The apparatus includes a hardware data mover that moves a memory page to a different memory tier in response to the page move command from the operating system.

FIG. 1 illustrates an example of a system 100 for providing page migration. In this example the system 100 includes one or more server processors that include for example a processor 110 such as a data processor and a processor 112 such as a central processing unit that executes stored executable instructions that when executed operate as an operating system and/or hypervisor, drivers, application program interface (API), and guest operating systems as further described herein. The server processor in some implementations is an integrated circuit, system on chip or any other suitable configuration. In this example the system 100 also includes one or more IO devices 114 and a tiered memory system 116 having a slower tiered memory 118 currently referred to as tier 1 memory, and a faster tiered memory 120, referred to tier 2 memory. The processor 110 includes a data fabric 122, and input output memory management unit (IOMMU) 124 and a hardware data mover 126. The IOMMU 124 provides suitable interfaces to one or more IO devices 114 so that the IO devices 114 can use memory of the tiered memory system. The IOMMU and IO devices communicate through one or more bus structures shown as 163. The data fabric 122 also provides suitable interfaces for the tiered memory 116 through one or more communication links shown as 162. The data fabric 122 communicates with the IOMMU 124 through communications link 164.

In some implementations, the hardware data mover 126 includes a processor 130, such as a security processor, and a direct memory access (DMA) engine 135 that in some implementations is implemented as a micro controller that executes firmware. Similarly, the processor 130 in some implementations is also implemented as a processor executing firmware. In some implementations, the hardware data mover 126 communicates with the data fabric 122 through the IOMMU and communicates with the IOMMU via one or more communication links 150. In other implementations the data mover communicates directly with the data fabric.

The processor 112 in some implementations serves as the processor that executes the operating system or hypervisor. In virtualized systems, the processor 112 also produces guest operating systems 152 as known in the art. These guest operating systems facilitate interfacing with virtual machines. In virtualized systems a hypervisor is used and then one or more guest virtual machines run under the hypervisor's control. A non-virtualized system runs an Operating System. In a virtualized system the hypervisor owns the system physical memory map. In a non-virtualized system the OS owns the system physical memory map. In this example, the operating system or hypervisor includes a page migration policy engine 155. The processor 112 also includes a page performance profiler 156, such as a driver, a page profiler API 158 and a data mover API 160.

The processor 130 receives page move commands 168 and other commands from the processor 112 and in the case of move commands employs the DMA engine 135 to make page moves from for example a slower memory tier 118 to a faster memory tier 120 when the page performance profiler 156 identifies pages in the tiered memory system 116 that are hot in the slower tiered memory 118. In some implementations the page performance profiler 156 scans Accessed/Dirty bits in page table entries (PTEs) to identify frequently accessed pages. Stated another way, when pages are accessed often in the slower tiered memory, the page performance profiler 156 identifies those pages and provides a rank on a per page basis or group of page basis to the page migration policy engine 155 through the page profiler API 158 so that the page migration policy engine 155 can make a decision as to whether to move a page from a slower tiered memory to a faster tiered memory. The page migration policy engine 155 maintains a page migration list 165 in memory that is a list of pages in each particular tiered memory to be moved by the hardware data mover 126.

The system 100 accommodates moving pages that are being actively read and/or written by IO devices 116. Movement of pages being actively read and/or written by the CPU 112 in some implementations are handled in conventional manner. For example, page migration changes the page's address mapping from one system physical address to another and copies the data from the "old" address to the "new" address. Traditional Hypervisor or OS software updates the page tables for the CPU address mapping (deleting the old address mapping, then installing the new address mapping once the Page Migration is done). The hardware data mover copies the data to its new page and updates the address mapping in the IOMMU page tables.

In some implementations the page performance profiler 156 is a driver that executes on the CPU, in other implementations the page performance profiler 156 is located in the hardware data mover 126 and is firmware executed by the security processor 130 or DMA engine 135. Other variations are also contemplated.

In some implementations the page profiler 156 identifies frequently accessed memory pages in a slower tiered memory region and generates page hotness ranking information 166 indicating a likelihood of a memory page being accessed in the future. The page migration policy engine 155, such as an operating system or hypervisor issues the page move command 168 to the hardware data mover 126, based on the page hotness ranking information 166. For example, if the hotness ranking information 166 shows a high ranking for a particular page or set of pages in the slower tier memory, meaning the pages are being accessed often, the move command 168 is issued to move the pages to a faster tier of memory. The hardware data mover (HDM) 126 moves a memory page from a slower tiered memory to a faster tiered memory in response to the page move command from the operating system. Page moves from faster tier to a slower tier are also performed by the data mover as needed as directed by the OS or hypervisor.

In some implementations, the hardware data mover 126 pauses the IOMMU 124 so that the requesting engine such as a PCIe, or other I/O device can continue issuing reads and writes to other pages, but access to the page being migrated are stalled at the IOMMU. For example, in some implementations, the system modifies the IOMMU page table entry/entries that should be blocked so the IOMMU will stall trying to translate a request address from an I/O device. The hardware data mover 126 blocks access to the "old" address and any accesses to it are stalled at the IOMMU. The data mover then moves the data from the "old" page to the new one. Once the data movement is done the data mover updates the IOMMU page tables to map to the "new" address in place of the "old" one and releases the IOMMU stall. The IOMMU from there on will send any requests from I/O devices to the "new" address.

In some implementations a separate page table is maintained for each of the CPU and for the IOMMU to enable CPU versus IOMMU page access profiling. In some implementations, the profiler 156 provides a list of frequently accessed "slow memory" pages suggested for migration from a slower tier of memory to a faster tier of memory by issuing with page hotness information (e.g., a rank and metadata).

In certain implementations multiple types of move commands are employed as further set forth below with respect to FIG. 3. In some implementations the move command includes command data that causes the hardware data mover to provide a secure nested paging batch move of multiple memory pages to memory regions in a faster tiered memory. In some implementations the move command SNP_PAGE_MOVE_GUEST CMD includes command data that causes the hardware data mover to provide a secure nested paging move of one or more memory pages for a guest operating system. In some implementations a PAGE_MOVE_IO command includes command data that causes the hardware data mover to move contents of one or more pages that may be actively in use by a direct memory access device in a non-secure nested paging system to memory that is either unencrypted or encrypted using an operating system or hypervisor owned key.

In certain implementations a SNP_PAGE_MOVE_IO command includes command data that causes the hardware data mover to provide a secure nested paging move of I/O device pages that moves pages that are actively in use by a direct memory address device.

The processor 112 executes stored code that when executed provides the data mover API 160 between the operating system, such as the page migration policy engine 155 and the hardware data mover 126 that provides the move commands to the hardware data mover 126 and provides returned page migration data, such as confirmation that the move occurred successfully, from the hardware data mover to the operating system.

Figure 2:
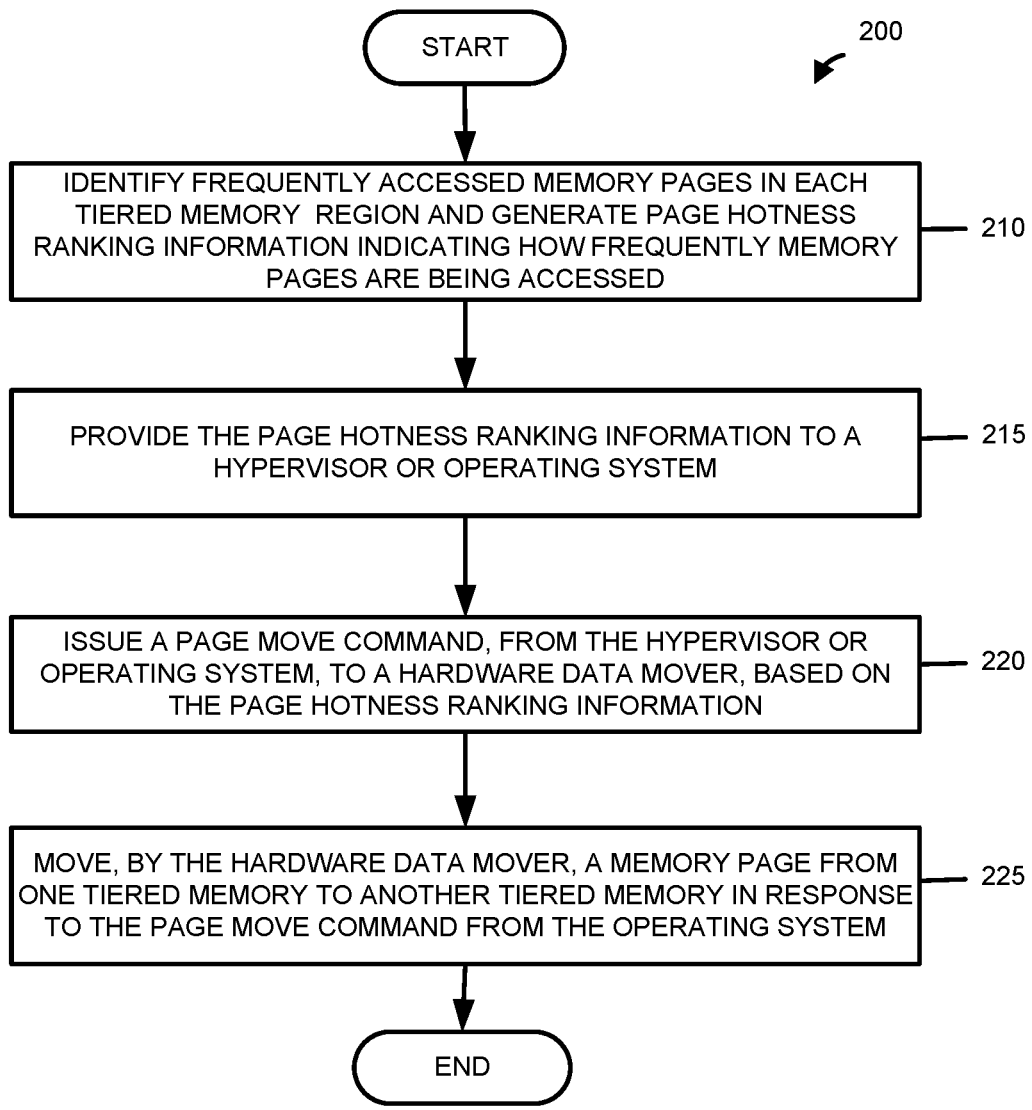
FIG. 2 is a flow diagram illustrating a method for providing page migration in a tiered memory system in accordance with one example set forth in the disclosure.

FIG. 2 is a flow chart illustrating an example of a method 200 for providing page migration in a multitiered memory system, such as for page migration for IO devices that use the tiered memory. It will be recognized that the operations may be performed in any suitable order and may be performed by any suitable structure. In this example, the method is performed by the system of FIG. 1. As shown in block 210 the method includes identifying frequently accessed memory pages in each memory tier, such as a slower tiered memory region and faster tiered memory and generate page hotness ranking information 166 indicating a frequency that memory pages are being accessed. In some implementations this is done by the profiler 156. As shown in block 215 the method includes providing, such as by the profiler 156, the page hotness ranking information 166 to an operating system or hypervisor, such as the policy engine 155. As shown in block 220 the method includes issuing the page move command 168, by the operating system, to the hardware data mover 126, based on the page hotness ranking information 166. As shown in block 225 the method includes moving, by the hardware data mover 126, a memory page to a different memory tier such as from a slower tiered memory 118 to a faster tiered memory 120 in response to the page move command 168 from the operating system or hypervisor.

The profiler 156 in one example is software executed by a processor that attempts to identify frequently accessed memory pages that are mapped to slower tiered memory regions as such pages are likely candidates to be migrated to faster memory tier for better system performance. In some implementations the profiler provides a page hotness rank. In some implementations the profiler aggregates the profiling statistics for each page into a page hotness rank:

HotnessRank=f (recency, frequency, sharing, clean/dirty, memory tier).

The hotness rank describes how frequently a page was accessed in the past. Pages that rank higher are to be placed into the faster memory tier to improve performance.

In some implementations, for each page, the profiler also supplies the following information along with the rank: host virtual and system physical addresses (HVA and sPA) obtained directly from the monitoring hardware (e.g., DMA) page size and the memory tier the page currently resides on (faster vs. slower memory tier), obtained directly from the monitoring hardware (e.g., DMA) or generated based on the memory map (faster vs. slower memory tier address regions) obtained from the Advanced Configuration and Power Interface (ACPI) HMAT=Heterogeneous Memory Attributes Tables and SRAT=System Resource Affinity Table.

It will be recognized that the profiler can use various methods to identify these pages. Different systems may choose to configure their profiler differently, depending on what works best for their workload and hardware/software configuration. Future systems may add, remove or change the methods used in the profiler also, but the output of the profiler that is sent to the policy engine is meant to stay consistent, regardless of the underlying methods used in the profiler. This allows hypervisor and operating system vendors to write a policy engine for page migration that will continue to work with future processors and their performance profiling drivers without having to modify the policy engine.

The policy engine 155 runs at the top-level hypervisor or operating system that owns the system physical address map. It takes inputs 166 from the performance profiling driver 156, or any other source it wants to consider, and makes whatever page migration decisions it thinks are best for the system. Any suitable decision process may be employed and is left to the hypervisor or operating system vendor.

The hypervisor/operating system's policy engine 155 is responsible for managing the overall physical memory, allocating and reserving it as necessary to allow page migration. The policy engine may reserve a pool of DRAM pages so it can quickly move pages from the slower memory tier to faster memory as needed. These memory management choices are left to the hypervisor or operating system vendor.

Some systems employ VM security. For example, Advanced Micro Devices (AMD) introduced Secure Encrypted Virtualization (SEV), the first x86 technology designed to isolate virtual machines (VMs) from the hypervisor. While hypervisors have traditionally been trusted components in the virtualization security model, many markets can benefit from a different VM trust model. In the cloud for instance, customers may want to secure their VM-based workloads from the cloud administrator to keep their data confidential and minimize their exposure to bugs in the cloud provider's infrastructure. This leads to a desire to isolate VMs at a hardware level from the hypervisor and other code that may happen to coexist on the physical server.

AMD began tackling this challenge through the use of main memory encryption in SEV. With this technology, individual VMs could be assigned a unique Advanced Encryption Standard (AES) encryption key that is used to automatically encrypt their in-use data. When a component such as the hypervisor attempts to read memory inside a guest, it is only able to see the encrypted bytes.

AMD later introduced the SEV-ES (Encrypted State) feature which added additional protection for CPU register state. In SEV-ES, the VM register state is encrypted on each hypervisor transition so that the hypervisor cannot see the data actively being used by the VM. Together with SEV, SEV-ES reduce the attack surface of a VM by helping protect the confidentiality of data in memory. The next generation of SEV is called SEV-SNP (Secure Nested Paging). SEV-SNP builds upon existing SEV and SEV-ES functionality while adding new hardware-based security protections. SEV-SNP (also referred to as SNP) adds strong memory integrity protection by assigning ownership of physical memory pages to VMs. Only a VM that owns a page may modify the page. SEV-SNP helps prevent malicious hypervisor-based attacks like data replay, memory re-mapping, and more in order to create an isolated execution environment. Also, SEV-SNP introduces several additional optional security enhancements designed to support additional VM use models, offer stronger protection around interrupt behavior, and offer increased protection against recently disclosed side channel attacks.

Also, while the decision-making process the policy engine uses will be up to the hypervisor/operating system vendor, in some implementations there are some actions the policy engine should execute as part of the page migration process. For example, once the policy engine has identified pages it wishes to migrate it should make CPU host pages non-present and invalidate CPU TLBs. Also, if a non-SNP hypervisor fails to do this non-SNP guest state may become corrupted by CPU activity during page migration. If a SNP hypervisor fails to do this, page migration will fail. The policy engine must also offline host pages from the address translation services (ATS) as defined in the PCI-Express specification if there are any CXL devices or non-secure ATS devices. If the policy engine 155 wants to migrate 2 MB or 1 GB pages in some implementations the policy engine performs a page-smash to convert them to 4 KB pages before calling the data mover unless the data mover handles larger than 4 KB pages. In SNP-enabled systems, the source and destination pages are expected to be in the appropriate state. For example, if pages owned by the hypervisor are being moved the source and destination pages are expected to be in the hypervisor state. Similarly, if pages owned by the guest OS are being moved, the source pages are expected to be in the guest-Valid or guest-Invalid states and the destination pages are expected to be in the pre-migration state. The policy engine then sends the appropriate move command (e.g., a mailbox message) to the data mover 126.

Certain IOMMU page table requirements are placed on the hypervisor or OS. For example in some implementations, the hypervisor or OS has only a single IOMMU host page table for any guest Physical Address (GPA) to System Physical Address (sPA) mapping. There can be multiple host page tables mapping different sections of memory. For example, each virtual machine may have its own IOMMU host page tables.

The hardware data mover 126 performs a variety of functions to block and invalidate current page translations, copy data from source to destination pages and set up new IOMMU page translations once the data movement is complete. In SNP-enabled systems the data mover will also enforce SNP security guarantees and update the SNP Reverse Map Table (RMP) appropriately. In some implementations, the data mover employs the data mover API 160, such as a security processor (SP) application programming interface (API), that is called by the policy engine 155 to request specific pages be moved by the SP and the hardware (e.g., DMA engine 135) under its control. It is contemplated that this API will remain consistent across multiple processor generations that support page migration which allows flexibility for future processor designs.

As set forth above, the profiler 156 identifies frequently accessed pages that the hypervisor or operating system might choose to migrate from the slower memory tier to faster tier memory. The policy engine in the hypervisor or operating system actually decides which pages to migrate based on its analysis of the hotness ranking information and any other factors it needs to consider. The data mover carries out the commands of the Policy engine to migrate pages from their current address to a new address. The above system supports a virtualized system where a guest OS has allocated I/O buffers in the slower memory Tier. These I/O buffers may be pinned pages in the guest. The disclosed page migration system allows a hypervisor to detect that the guest OS is frequently accessing these slower memory Tier pages and decide to relocate them to higher performing memory pages while the guest OS remains unaware of any change. Page migration is possible even in virtualized systems using Secure Nested Paging (SNP) and Secure Encrypted Virtualization (SEV) features.

The hardware data mover unlike prior systems is programmable to move batches of pages such as groups of 64 4 KB pages for multiple guest OS's wherein each guest has its own security key to encrypt and decrypt pages solely for a particular guest as managed by the security processor. For example, the security processor tells the data mover the appropriate guest encryption/decryption key to move a page with. This moves the proper contents of the page to a new location without exposing those contents or the key to the hypervisor.

Figure 3:
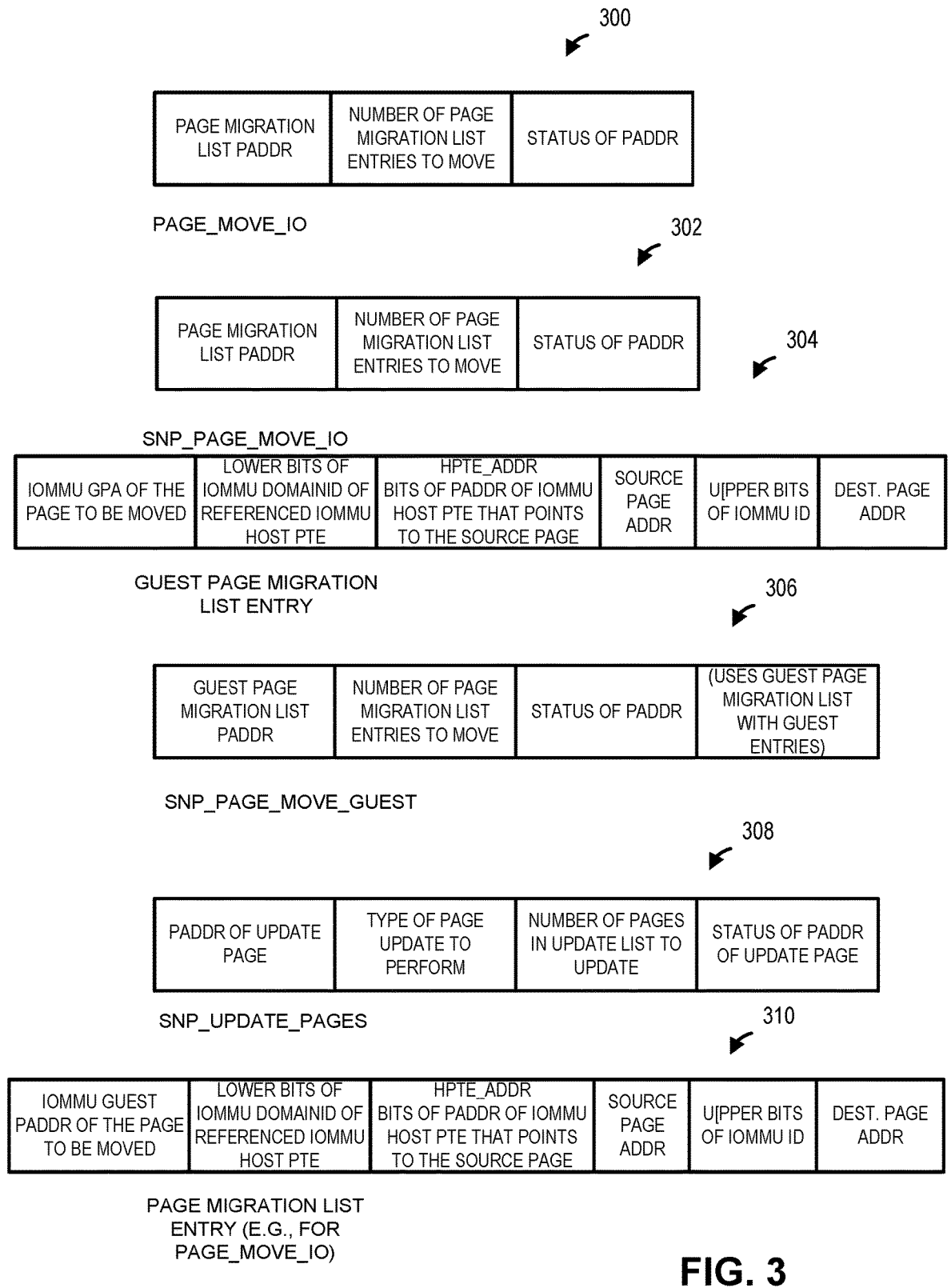
FIG. 3 is a diagram illustrating page move commands in accordance with one example set forth in the disclosure.

FIG. 3 illustrates examples of page move commands that in some implementations are issued by the page migration policy engine 155 depending on the system design. The PAGE_MOVE_IO command 300 in some implementations is used for non-SNP hypervisors with guests with I/O DMA but with no SNP/SEV capability. The command 300 is desired for non-SNP hypervisors or bare metal OSes (Host owns memory) and the page migration policy engine 155 may use the command to manage tiered memory systems.

The PAGE_MOVE_IO command 300 moves the contents of one or more pages in a non-SNP system to memory that is either unencrypted or encrypted using a hypervisor owned key. This command allows for the movement of one or more pages within the system physical address space while the page may be actively in use by DMA devices including devices that generate DMA to pinned memory. It directly updates the IOMMU host PTEs to point to the new page locations. The IOMMU host page table is used to map device DMA. In one example, the page move command 300 includes command data representing the physical address of the page migration list, the number of page migration list entries to move and the status of the physical address. The source pages contained within the page migration list may belong to the hypervisor or to different guests.

An example of a page migration list entry 310 is shown to include the IOMMU guest physical address (GPA) of the page to me moved, lower bits of an IOMMU identifier of a referenced IOMMU host page table entry (PTE), a pointer to the source page, the source page address, upper bits of the IOMMU identifier and the destination page address.

The SNP_PAGE_MOVE_IO command 302 moves the contents of one or more hypervisor pages within the system physical address space in a system that has enabled SNP while preserving SNP security guarantees. This command will not migrate any pages, both source and destination pages, that are not in the proper security state. If they are in the proper state for migration, the copy is done by the data mover with the correct encryption/decryption key, but without exposing the page contents or the key value. The pages may be shared between the hypervisor and various guest OS's. Memory may be either unencrypted or encrypted using a hypervisor key. The command 302 moves pages that may be actively in use by DMA devices. The command directly updates the IOMMU host page table entries to point to new page locations. In some implementations the CPU is prevented from accessing the pages that are to be moved. As with some other page move commands a page migration list address is provided by the OS as part of the move command to identify the source physical address of the page migration list. The page migration list contains the list of pages to be moved including their source and destination addresses.

An example of a guest page migration list entry 304 includes the IOMMU guest physical address (GPA) of the page to me moved, lower bits of an IOMMU identifier of a referenced IOMMU host page table entry (PTE), a pointer to the source page, the source page address, upper bits of the IOMMU identifier and the destination page address.

The SNP_PAGE_MOVE_GUEST command 306 moves the contents of one or more pages belonging to an SNP-aware, SEV guest within the system physical address space without violating the SNP security guarantees. If there is concurrent DMA to the page during the migration process, the DMA may be aborted. The CPU should be prevented from accessing the pages to be moved, generally by making them non-present in the CPU host page table. After successful migration, the destination pages take on the state of their corresponding source page and the source pages are returned to a pre-migration state. The command 306 includes a guest page migration list physical address, the number of page migration list entries to move and the status of the physical address.

The SNP_UPDATE_PAGES command 308 converts a list of pages from one reverse map table (RMP) state to another. For example, from hypervisor state into a pre-migration state and vice versa. This operation may be used in place of an RMPUPDATE command in cases where the OS wants to change the state of a large number of pages. The RMP is the "security state" for every page of memory in a Secure Nested Paging (SNP)-enabled system, so the security processor needs to be involved whenever there is a change in the RMP. In some implementations, up to 4096 pages may be moved by a single SNP_UPDATE_PAGES command. Also, there is no requirement for the pages described in the page migration list to be adjacent to each other.

In some implementations, the page update list contains between 1 and 127 page update list entries within an aligned 4 KB region of memory. If there are additional pages to be updated, the upper 32 bytes of the 4 KB region contain a next page update list entry which points to the next portion of the list.

Figure 4:
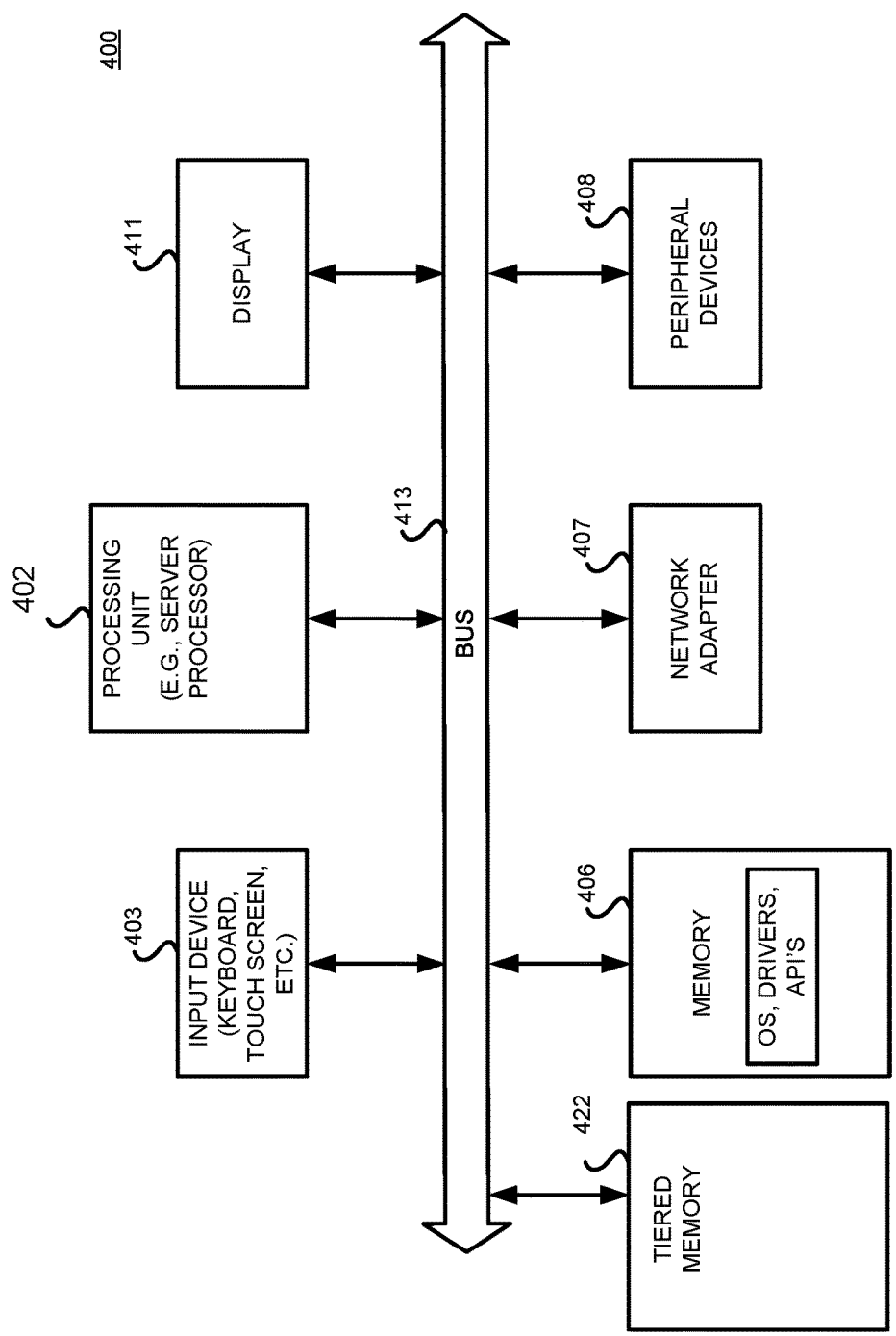
FIG. 4 is a block diagram illustrating one example of an apparatus for providing page migration in accordance with one example set forth in the disclosure.

FIG. 4 illustrates an embodiment of a computing system 400 such as a cloud platform that employs one or more server processors 402 that perform page migration as set forth above. In general, the computing system 400 is embodied as any of a number of different types of devices, including but not limited one or more cloud servers, or other devices that includes memory 406 and may be a system on-chip, integrated circuits, multipackage device etc. In this example, the computing system 400 includes a number of components that communicate with each other through a bus structure 412. In computing system 400, each of the components is capable of communicating with any of the other components either directly through the bus 412, or via one or more of the other components. The components in computing system 400 in some implementations are contained within a single physical enclosure, such as a server chassis, laptop or desktop chassis, or a mobile phone casing or in some implementations the display is remote from a system on-chip or other configuration. In alternative embodiments, some of the components of computing system 400 are embodied as peripheral devices 408 such that the entire computing system 400 does not reside within a single physical enclosure. The system includes tiered memory 422.

In some implementations, the computing system 400 also includes user interface devices for receiving information from or providing information to a user. Specifically, the computing system 400 includes an input device 402, such as a keyboard, mouse, touch-screen, or other device for receiving information from the user. The computing system 400 in some implementations displays information to the user via a physical monitor 411, such as light-emitting diode (LED) display, liquid crystal display, or other output device. However, such devices need not be employed.

In certain implementations, computing system 400 additionally includes a network adapter 407 for transmitting and receiving data over a wired or wireless network. Computing system 400 also includes one or more peripheral devices 408. The peripheral devices 408 may include mass storage devices, location detection devices, sensors, input devices, or other types of devices used by the computing system 400.

The processing unit 402 receives and executes instructions that are stored in a memory system 406 such as operating systems including hypervisors, applications, drivers, API's and other code. In one embodiment, the processing unit 402 includes multiple processing cores that reside on a common integrated circuit substrate. Memory system 406 includes memory devices used by the computing system 400, such as random-access memory (RAM) modules, read-only memory (ROM) modules, hard disks, and other non-transitory computer-readable media. Some of the memory devices are used as memory for the processing unit 402.

Some embodiments of computing system 400 may include fewer or more components than the embodiment as illustrated in FIG. 4. For example, certain embodiments are implemented without any display 411 or input devices 402. Other embodiments have more than one of a particular component, for example, an embodiment of computing system 400 could have multiple processing units 402, buses, network adapters 407, memory systems 406, etc.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for providing page migration of pages among tiered memories comprising:
   identifying frequently accessed memory pages in each tiered memory region and generate page hotness ranking information indicating how frequently memory pages are being accessed in a respective tiered memory region;
   providing the page hotness ranking information to at least one of: an operating system or hypervisor executing on a first processor;
   issuing a page move command by the first processor, by the operating system or hypervisor, to a hardware data mover, based on the page hotness ranking information; and
   in response to processing the page move command from the first processor, delaying input output memory management unit address mappings and moving, by the hardware data mover, a memory page from one memory tier to another memory tier in response to the page move command from the operating system or hypervisor.

2. The method of claim 1 wherein issuing the page move command comprises issuing command data that causes the hardware data mover to provide a secure nested paging batch move of a first plurality of memory pages associated with a first guest operating system to a different memory tier and move a second plurality of memory pages associated with a second guest operating system to a different memory tier region.

3. The method of claim 1 wherein issuing the page move command comprises issuing command data that causes the hardware data mover to provide a secure nested paging move of one or more memory pages securely owned by a guest operating system.

4. The method of claim 1 wherein issuing the page move command comprises issuing command data that causes the hardware data mover to move contents of one or more pages in use by a direct memory access device in a non-secure nested paging system to memory that is either unencrypted or encrypted using an operating system or hypervisor owned key.

5. The method of claim 1 wherein issuing the page move command comprises issuing command data that causes the hardware data mover to provide a secure nested paging move of input/output (I/O) device pages that moves I/O device pages that are in use by a direct memory access device.

6. The method of claim 1 comprising providing an application programming interface (API) between the operating system and the hardware data mover that provides the page move command to the hardware data mover and provides returned page migration data from the hardware data mover to the operating system.

7. An apparatus for providing page migration of pages among tiered memories comprising:
  one or more processors configured to execute stored code that when executed cause the one or more processors to:
  identify frequently accessed memory pages in each memory tier region and generate page hotness ranking information indicating how frequently memory pages are being accessed in a respective tiered memory region;
  an operating system or hypervisor configured to issue a page move command to a hardware data mover, based on the page hotness ranking information; and
  a hardware data mover, operatively coupled to the one or more processors, and operative to delay input output memory management unit address mappings and to move a memory page to a different memory tier from a current tier in response to processing the page move command received from one or more processors executing the operating system or hypervisor.

8. The apparatus of claim 7 wherein the page move command comprises command data that causes the hardware data mover to provide a secure nested paging batch move of a first plurality of memory pages associated with a first guest operating system to a different memory tier and move a second plurality of memory pages associated with a second guest operating system to a different memory tier region.

9. The apparatus of claim 7 wherein the page move command comprises command data that causes the hardware data mover to provide a secure nested paging move of one or more memory pages securely owned by a guest operating system from a current memory tier region to a different memory tier region.

10. The apparatus of claim 7 wherein issuing the page move command comprises issuing command data that causes the hardware data mover to move contents of one or more pages in use by a direct memory access device in a non-secure nested paging system to memory that is either unencrypted or encrypted using an operating system or hypervisor owned key.

11. The apparatus of claim 7 wherein the page move command comprises command data that causes the hardware data mover to provide a secure nested paging move of input/output (I/O) device pages that moves I/O device pages that are in use by a direct memory access device.

12. The apparatus of claim 7 wherein the one or more processors execute stored code that when executed cause the one or more processors to provide an application programming interface (API) between the operating system and the hardware data mover that provides the page move command to the hardware data mover and provides returned page migration data from the hardware data mover to the operating system.

13. The apparatus of claim 7 comprising an input/output memory management unit operatively coupled to the hardware data mover and operative to interface with input/output units that access the tiered memories and wherein the hardware data mover comprises:
  a security processor (SP); and
  a direct memory access engine (DMA), in communication with the security processor, and wherein the security processor is operative to process the page move command and wherein the DMA engine is operative to move one or more pages between different tiers of memory from a current memory tier region to a different memory tier region.

14. An apparatus for providing page migration in a multi-tier memory system comprising:
  one or more first processors configured to execute stored code that when executed cause the one or more first processors to operate an operating system or hypervisor configured to issue a page move command to a hardware data mover, based on page hotness ranking information;
  the hardware data mover comprising a second processor; and
  a direct memory access (DMA) engine, in communication with the second processor and wherein the second processor is operative to process a page move command from the operating system or hypervisor;
  and wherein the DMA engine is operative to delay input output memory management unit address mappings and to move one or more pages between different tiers of memory from a respective current tiered memory region in response to the processed based on-the-page move command processed by the second processor.

15. The apparatus of claim 14 wherein the second processor is configured to process command data that causes the hardware data mover to provide a secure nested paging batch move of a plurality of memory pages associated with a first guest operating system to a different memory tier and move a second plurality of memory pages associated with a second guest operating system to a different memory tier.

16. The apparatus of claim 14 wherein the second processor is configured to process command data that causes the hardware data mover to provide a secure nested paging move of one or more memory pages owned by a guest operating system.

17. The apparatus of claim 14 wherein the second processor is configured to process command data that causes the hardware data mover to move contents of one or more pages in use by a direct memory access device in a non-secure nested paging system to memory that is either unencrypted or encrypted using an operating system or hypervisor owned key.

18. The apparatus of claim 14 wherein the second processor is configured to process command data that causes the hardware data mover to provide a secure nested paging move of input/output (I/O) device pages that moves I/O device pages that are in use by a direct memory address device.

19. The apparatus of claim 14 wherein the second processor is a security processor configured to provide page moves for secure nested pages.

* * * * *